(12) United States Patent
Mitsutani

(10) Patent No.: US 7,584,157 B2
(45) Date of Patent: Sep. 1, 2009

(54) METHOD, DEVICE AND COMPUTER PROGRAM PRODUCT FOR LEARNING CORRELATION MATRIX

(75) Inventor: Naoki Mitsutani, Tokyo (JP)

(73) Assignee: NEC Corporation, Tokyo (JP)

( * ) Notice: Subject to any disclaimer, the term of this patent is extended or adjusted under 35 U.S.C. 154(b) by 628 days.

(21) Appl. No.: 10/119,762

(22) Filed: Apr. 11, 2002

(65) Prior Publication Data

US 2002/0174078 A1 Nov. 21, 2002

(30) Foreign Application Priority Data

Apr. 18, 2001 (JP) ............................ 2001-119614

(51) Int. Cl.
*G06N 5/00* (2006.01)
(52) U.S. Cl. .......................................... 706/12; 706/45
(58) Field of Classification Search .................. 706/12, 706/17, 406.05; 714/784, 17; 379/406.05, 379/784
See application file for complete search history.

(56) References Cited

U.S. PATENT DOCUMENTS

| | | | | |
|---|---|---|---|---|
| 5,148,385 A | | 9/1992 | Frazier | |
| 5,293,453 A | * | 3/1994 | Frazier | .................. 706/17 |
| 5,440,670 A | * | 8/1995 | Frazier | .................. 706/17 |
| 5,717,825 A | | 2/1998 | Lamblin | |
| 5,832,466 A | * | 11/1998 | Feldgajer | .................. 706/13 |
| 6,597,787 B1 | * | 7/2003 | Lindgren et al. | ........ 379/406.05 |
| 6,789,226 B2 | * | 9/2004 | Mitsutani | .................... 714/784 |

2003/0061035 A1 3/2003 Kadambe

FOREIGN PATENT DOCUMENTS

| | | |
|---|---|---|
| EP | 0 428 449 A2 | 5/1991 |
| EP | 1 162 751 A1 | 12/2001 |
| JP | 07-084599 | 3/1995 |
| JP | 08-235145 | 9/1996 |
| JP | 09-306102 | 11/1997 |

(Continued)

OTHER PUBLICATIONS

James, et al., Mathematics Dictionary, Fifth Edition, Chapman & Hall, New York, NY, 1992, pp. 18 and 347.*

(Continued)

*Primary Examiner*—Wilbert L Starks, Jr.
(74) *Attorney, Agent, or Firm*—McGinn IP Law Group, PLLC

(57) ABSTRACT

An arithmetic unit 15 multiplies a codeword X and a correlation matrix W. A comparison unit 17 compares the products output from the arithmetic unit 15 with a threshold ±TH. A learning state monitor 18 updates the correlation matrix based on the comparison results from the comparison unit. When all of the codewords are updated and the calculation results using the updated correlation matrix fall within a predetermined range, the threshold is changed to repeat the learning operation again for all of the codewords. When the calculation results obtained from the updated correlation matrix do not fall within a predetermined range and equal the previous calculation results, the update value for the correlation matrix is decreased to repeat the learning operation again for all of the codewords. When the update value becomes 0, an optimal threshold as well as an optimal correlation matrix are obtained, thereby completing the learning operation.

20 Claims, 4 Drawing Sheets

FOREIGN PATENT DOCUMENTS

| | | |
|---|---|---|
| JP | 10-247838 | 9/1998 |
| JP | 11-161670 | 6/1999 |
| JP | 11-161671 | 6/1999 |
| JP | 2001-352250 | 12/2001 |
| JP | 2002-111515 | 4/2002 |

OTHER PUBLICATIONS

Japanese Office Action dated Jun. 25, 2003, with partial English translation.

European Search Report dated Nov. 23, 2004.

* cited by examiner

METHOD, DEVICE AND COMPUTER PROGRAM PRODUCT FOR LEARNING CORRELATION MATRIX

FIELD OF THE INVENTION

The present invention relates to a method, a device and a computer program product for learning a correlation matrix to obtain an optimal correlation matrix used for a decoding system. More particularly, the present invention relates to a method, a device and a computer program product for learning a correlation matrix to decode a block code as an error correction code by using the correlation matrix.

BACKGROUND OF THE INVENTION

A system for decoding a block code as an error correction code may use, for example, a correlation matrix. A correlation matrix represents correlation between an original pre-coded codeword and a coded codeword, and can be obtained through learning.

According to a conventional method for learning and obtaining a correlation matrix, a coded codeword and a pre-learned correlation matrix are used to perform a predetermined calculation, thereby obtaining a result containing multiple components. Then, each of the components contained in the result is compared with a predetermined threshold TH. Based on the comparison, elements of the pre-learned correlation matrix are updated to obtain a post-learned correlation matrix.

Specifically, assuming that the original pre-coded codeword has M bits and the coded codeword has N bits, their correlation matrix has N rows and M columns. When this correlation matrix is multiplied by the coded codeword, the result will contain M number of components corresponding to respective bits of the original pre-coded codeword. On the other hand, a threshold TH is set for each of the components of the original pre-coded codeword. Specifically, when a component of the original pre-coded codeword is "+1", then the threshold is set to "+TH" (TH>0). When a component of the original pre-coded codeword is "0", then the threshold is set to "−TH". Each of the components resulting from the calculation is compared with the corresponding threshold "+TH" or "−TH". When the components resulting from the calculation are to be compared to threshold "+TH", the components in the corresponding column of the correlation matrix are updated only when their values are lower than "+TH". On the other hand, when the components resulting from the calculation are to be compared to threshold "−TH", the components in the corresponding column of the correlation matrix are updated only when their values are higher than "−TH".

Specifically, when the component from the calculation is judged to be lower than the threshold "+TH", then an update value "$\pm \Delta W_k$" ($\Delta W_k > 0$) is added to each component in the corresponding column of the correlation matrix. When a component resulting from the calculation is judged to be higher than the threshold "−TH", then an update value "$\pm \Delta W_k$" is subtracted from each component in the corresponding column of the correlation matrix. The sign "±" of the update value for each row depends on the sign "±" of the corresponding bit of the coded codeword.

Thereafter, the above-described learning operation is repeated for all of the codewords until update can be no longer performed for the elements of the correlation matrix for all of the codewords. Once the correlation matrix is completely updated, the learning operation is converged and correlation matrix is obtained, which can be used for decoding.

When the elements of the correlation matrix have no difference in the calculation results before and after the update, the operation enters an endless loop. In this case, the update value is changed from "$\pm \Delta W_k$" to "$\pm \Delta W_{k+1}$" ($\Delta W_k > \Delta W_{k+1} > 0$) and the above-describe learning operation is continued.

According to a conventional method for learning a correlation matrix, the update value for learning the correlation matrix is initially set to a high value, and gradually decreased as the learning operation proceeds to rapidly converge the learning operation. However, when the range given by the threshold "TH" set in the learning operation is very large, the number of runs of the learning operation required for all of the codewords becomes larger, thus requiring longer time.

Another problem is that an optimal threshold "TH" for converging the learning operation of the correlation matrix for all of the multiple (many) codewords and at the same time for obtaining a sufficient margin for occurrence of bit error of "±TH" for all codewords is unknown.

In view of the above-described problems, the present invention has an objective of providing a method, a device and a computer program product for learning a correlation matrix, where the correlation matrix is learned while gradually changing a threshold for learning the correlation matrix to search optimal thresholds for all of the multiple codewords, thereby rapidly obtaining an optimal correlation matrix for all of the codewords.

SUMMARY OF THE INVENTION

The present invention provides a correlation matrix learning method for obtaining an optimal correlation matrix used for obtaining an original codeword from a codeword, the method comprising the steps of: performing a predetermined calculation with the codeword and a pre-learned correlation matrix; comparing the results from the calculation step with a threshold; updating the pre-learned correlation matrix based on the comparison results obtained in the comparison step to obtain a post-learned correlation matrix; and using the obtained post-learned correlation matrix as a new pre-learned correlation matrix to repeat from the calculation step through the updating step, thereby obtaining an optimal correlation matrix. Every time the comparison results are obtained, it is judged whether or not the comparison results satisfy a first predetermined condition, if so, the threshold (absolute value) is increased at a predetermined rate.

The present invention also provides a correlation matrix learning device for obtaining an optimal correlation matrix used for obtaining an original codeword from a codeword, the device comprising; an arithmetic unit for performing a predetermined calculation using the codeword and a pre-learned correlation matrix; a comparison unit for comparing the calculation results output from the arithmetic unit with a threshold; and a learning state monitor for updating the pre-learned correlation matrix based on the comparison results output from the comparison unit to obtain a post-learned correlation matrix, where the obtained post-learned correlation matrix is used as a new pre-learned correlation matrix to repeat the predetermined calculation, the comparison and the updating to obtain an optimal correlation matrix. Every time the learning state monitor receives the comparison results, it judges whether or not the comparison results satisfy a first predetermined condition, and the device further comprises a threshold controller for increasing the threshold (absolute value) at a predetermined rate when the first predetermined condition is satisfied.

The present invention further provides a correlation matrix learning computer program product for obtaining an optimal correlation matrix used for obtaining an original codeword from a codeword, the program commanding a computer to execute the steps of: performing a predetermined calculation with the codeword and a pre-learned correlation matrix; comparing the results from the calculation step with a threshold; updating the pre-learned correlation matrix based on the comparison results obtained in the comparison step to obtain a post-learned correlation matrix; using the obtained post-learned correlation matrix as a new pre-learned correlation matrix to repeat from the calculation step through the updating step, thereby obtaining an optimal correlation matrix; and judging whether or not the comparison results satisfy a first predetermined condition every time the comparison result is obtained, if so, the threshold (absolute value) is increased at a predetermined rate.

BRIEF DESCRIPTION OF THE DRAWINGS

FIGS. 4A and 4B show the cases where a bit of the original codeword is "1" and "0", respectively.

DETAILED DESCRIPTION OF THE INVENTION

Hereinafter, an embodiment of the present invention will be described in detail with reference to the drawings.

Figure 1:
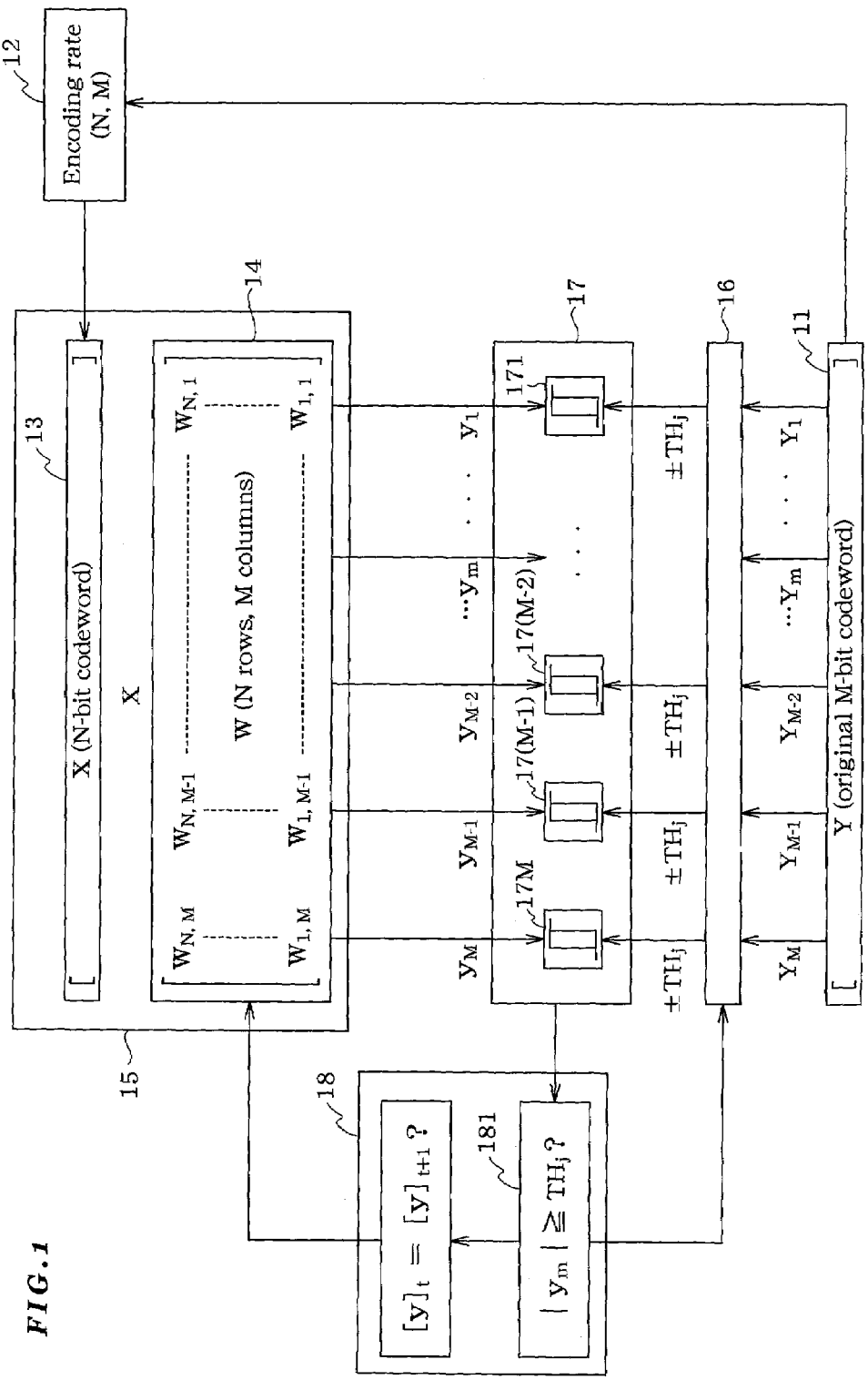
FIG. 1 is a block diagram showing a configuration of a correlation matrix learning device according to one embodiment of the invention.

FIG. 1 is a block diagram showing a configuration of a correlation matrix learning device for performing a correlation matrix learning method according to the present embodiment of the invention. The correlation matrix learning device is provided with: an original codeword input unit 11 for inputting an original M-bit codeword Y; an encoder 12 of an encoding rate (N, M) for performing block encoding on the original M-bit codeword Y input into the original codeword input unit 11 to obtain an N-bit codeword X; a codeword input unit 13 for inputting the N-bit codeword X coded by the encoder 12; a storage 14 for storing a correlation matrix W having N rows and M columns; an arithmetic unit 15 for multiplying the codeword X input into the codeword input unit 13 by the correlation matrix W with N rows and M columns stored in the storage 14, and outputting results y for M columns; a threshold updating unit 16 for changing M number of thresholds TH corresponding to the respective bits of the original codewords Y based on threshold update signals described later; a comparison unit 17 having M number of comparators for comparing the calculation results y for M columns output from the arithmetic unit 15 with the respective M number of thresholds TH set by the threshold updating unit 16; and a learning state monitor 18 for monitoring the comparison results output from the comparators 171-17M of the comparison unit 17, judging the learning convergence state based on the comparison results, outputting threshold update signals to the threshold updating unit 16 based on the judgment results, and determining an update value ΔW for the correlation matrix W based on the same comparison results from the comparison unit 17 to update the correlation matrix W stored in the storage 14.

Figure 2:
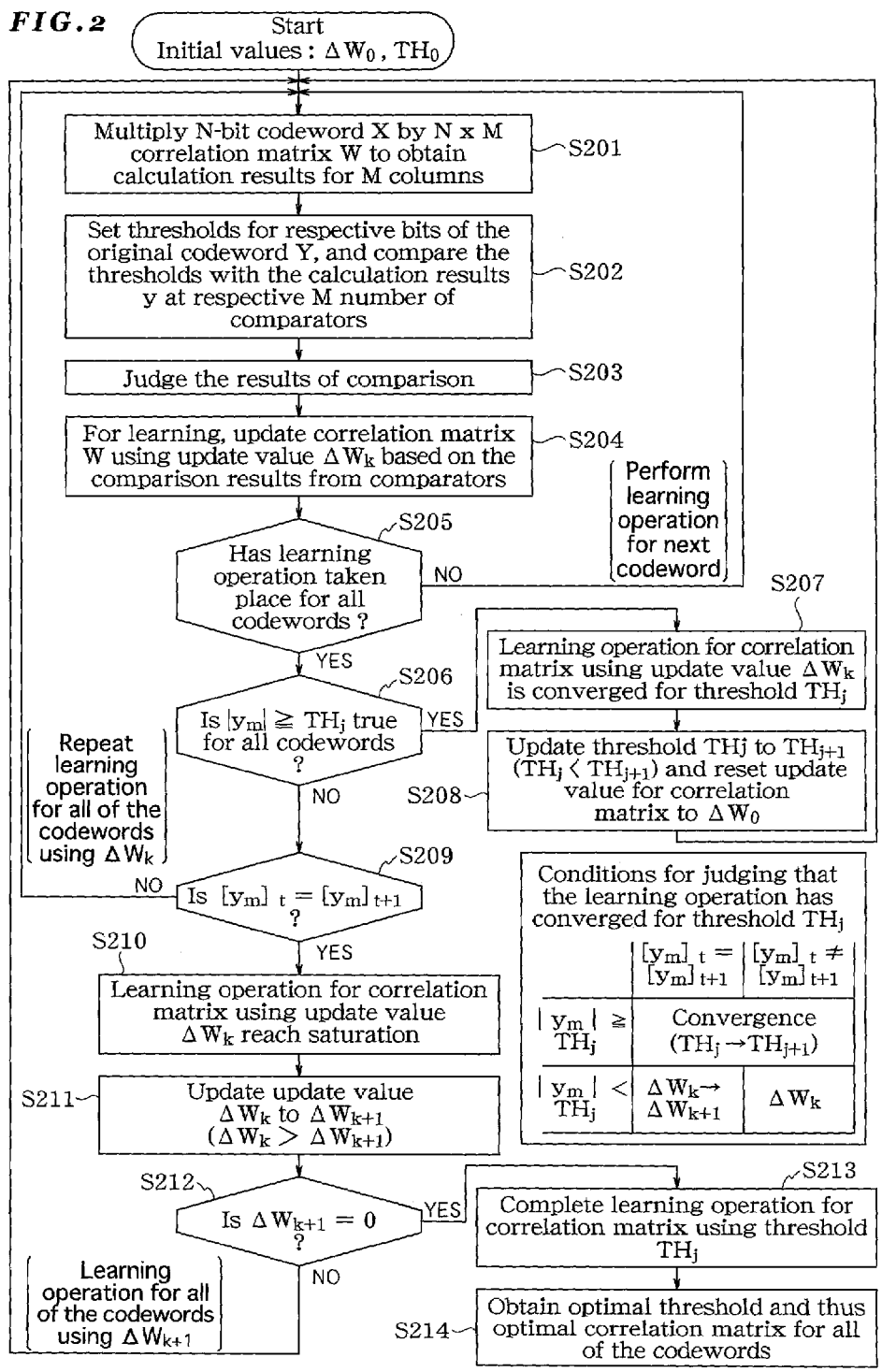
FIG. 2 is a flowchart for illustrating the operation by the correlation matrix learning device shown in FIG. 1.

Hereinafter, operation by the correlation matrix learning device shown in FIG. 1 will be described with reference to FIG. 2.

In the initial state, an arbitrary matrix with N rows and M columns is stored as a pre-learned correlation matrix W in the storage 14. Moreover, in the initial state, a threshold TH and an update value ΔW are set to $TH_0$ and $\Delta W_0$, respectively, in the learning state monitor 18.

According to the results of the learning operation described below, the threshold TH is successively updated as $TH_0 \square TH_1 \square TH_2 \square TH_3 \square \ldots$, increasing at a predetermined rate (e.g., incrementally or at a constant rate). Here, $TH_0 < TH_1 < TH_2 < TH_3 < \ldots$. The update value ΔW is also successively updated according to the results of the learning operation, as $\Delta W_0 \square \Delta W_1 \square \Delta W_2 \square \Delta W_3 \square \ldots$ at a predetermined rate to converge to zero. Here, $TH_0 > \Delta W_0 > \Delta W_1 > \Delta W_2 > \Delta W_3 > \ldots > 0$. Hereinafter, the threshold TH and the update value ΔW are represented by general expressions $TH_j$ (j=0, 1, 2, ...) and $\Delta W_k$ (k=0, 1, 2, ...), respectively.

First, a first original M-bit codeword Y is input into the original codeword input unit 11. Then, the encoder 12 performs block encoding on the original codeword Y at an encoding rate (N, M), and inputs the encoded N-bit codeword X into the codeword input unit 13. Here, the bits of the original codeword are represented as $Y_m$ (m=1, 2, ..., M–1, M) and bits of the coded codeword X are represented as $X_n$ (n=1, 2, ..., N–1, N).

Once the coded codeword X is input into the codeword input unit 13, the arithmetic unit 15 multiplies the row vectors indicating the codeword X by the correlation matrix W to obtain calculation results for M elements, $y_1, y_2, \ldots, y_m, \ldots, y_{M-1}, y_M$. The obtained calculation results for M columns are output to the respective comparators 171-17M of the comparison unit 17 (Step S201).

On the other hand, once the original codeword Y is input into the original codeword input unit 11, the threshold updating unit 16 sets thresholds TH for the respective bits of the original codeword Y based on the threshold update signals from a threshold controller 181 of the learning state monitor 18. In the initial state, a threshold update signal indicating the initial state is input into the threshold updating unit 16 from the learning state monitor 18, and thus the value of the threshold $TH_j$ (absolute value) is "$TH_0$". The threshold updating unit 16 sets "+$TH_j$" and "–$TH_j$" for bits "1" and "0", respectively.

By receiving the calculation results y for M columns from the arithmetic unit 15, the comparators 171-17M of the comparison unit 17 compare the calculation results with the corresponding thresholds $TH_j$, respectively (Step S202). Then, the comparison unit 17 notifies the learning state monitor 18 of the results of comparison as well as the calculation results y.

The learning state monitor 18 stores the calculation results y notified by the comparison unit 17. The learning state monitor 18 also receives the results of comparison from the comparison unit 17, and judges that update of the correlation matrix W using the update value $\Delta W_k$ is unnecessary if $|y_m| \geq TH_j$ or that update of the correlation matrix W using the update value $\Delta W_k$ is necessary if $|y_m| < TH_j$ (Step S203). In other words, where bit $Y_m$ of the original codeword Y is "1", the correlation matrix $W_m$ ('m'th column of the correlation matrix W) is not updated if the result $y_m$ of the calculation is "+$TH_j$" or higher, and updated if the result $y_m$ of the calculation is lower than "+$TH_j$". Where bit $Y_m$ of the original codeword Y is "0", the correlation matrix $W_m$ is not updated if the result $y_m$ of the calculation is "–$TH_j$" or lower, and updated if the result $y_m$ of the calculation is higher than "–$TH_j$". Thus, no update takes place when $y_m$ falls within the shaded range shown in FIG. 3, otherwise, update takes place.

When the original codeword $Y_m$ is "1", update of the correlation matrix $W_m$ takes place by adding or subtracting "$\Delta W_k$" to or from each element of $W_m$ according to the sign (i.e., ±) of the codeword $X_n$. On the other hand, when the original codeword $Y_m$ is "0", update of the correlation matrix $W_m$ takes place by adding or subtracting "–$\Delta W_k$" to or from each element of $W_m$ according to the sign (i.e., ±) of the codeword $X_n$.

Specifically, where the elements of $W_m$ is $W_{N,m}$, $W_{N-1,m}, \ldots, W_{1,m}$, each element is updated as follows.

When $Y_m$ is "1", $$W_{N,m} = W_{N,m} + Sgn(X_n) \cdot \Delta W_k$$

$$W_{N-1,m} = W_{N-1,m} + Sgn(X_{n-1}) \cdot \Delta W_k$$

$$\vdots$$

$$W_{1,m} = W_{1,m} + Sgn(X_1) \cdot \Delta W_k$$

When $Y_m$ is "0", $$W_{N,m} = W_{N,m} - Sgn(X_n) \cdot \Delta W_k$$

$$W_{N-1,m} = W_{N-1,m} - Sgn(X_{n-1}) \cdot \Delta W_k$$

$$\vdots$$

$$W_{1,m} = W_{1,m} - Sgn(X_1) \cdot \Delta W_k$$

Figure 4A:
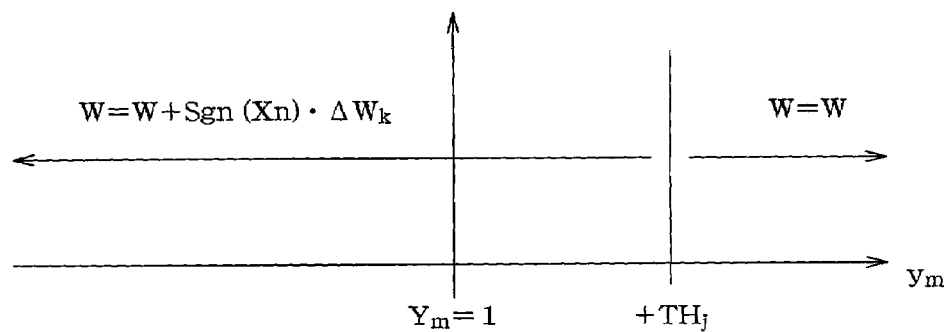
FIGS. 4A and 4B are diagrams showing a rule of learning a correlation matrix in the correlation matrix learning device shown in FIG. 1, where
Figure 4B:
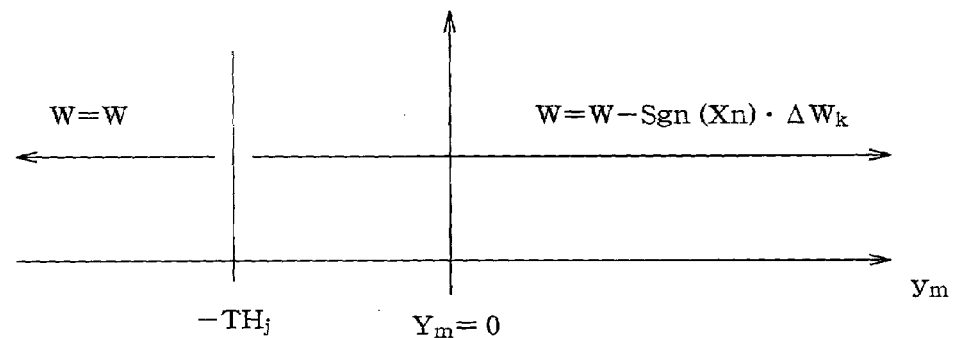

In the above equations, $Sgn(X_n)$ represents the sign ± of $X_n$. However, when $X_n$ is 0, $X_n$ is replaced by "–1" in the calculation. The state of this update can be illustrated as shown in FIGS. 4A and 4B.

Once the correlation matrix W is updated, the arithmetic unit 15 multiplies the updated correlation matrix W (i.e., the post-learned correlation matrix W) by the codeword X and outputs the calculation results y again. Where the elements of the products of the above-mentioned pre-learned correlation matrix W and the codeword X are represented as $[y_m]_t$, the present calculation results are represented as $[y_m]_{t+1}$. The comparison unit 17 compares the obtained current calculation results y with the thresholds $TH_j$ and notifies the learning state monitor 18 of the comparison results as well as the calculation results y.

In this manner, a first run of learning operation is completed for the first codeword X (Step S204).

Next, the learning state monitor 18 judges whether the learning operation has taken place for all of the codewords X (Step S205). Here, since the learning operation for only the first codeword X has just completed, the operation returns to Step S201 and the above-described operation is repeated for the second codeword X. Thereafter, the above-described operation of Steps S201 through S205 are repeated for the rest of the codewords X.

After the learning operation has taken place for all of the codewords X, the learning state monitor 18 judges whether $|y_m| \geq TH_j$ applies to all of the codewords X based on the comparison results sent from the comparison unit 17 (Step S206). In other words, the learning state monitor 18 judges, for all of the codewords X, whether or not the correlation matrix needs further update operation.

When $|y_m| \geq TH_j$ applies to all of the codewords X, learning operation for the correlation matrix using the update value $\Delta W_k$ is converged for the threshold $TH_j$ (Step S207). The threshold is updated from $TH_j$ to $TH_{j+1}$, the update value $\Delta W_k$ is reset to the initial value $\Delta W_0$ (Step S208), and the operation returns to Step S201.

Thereafter, the correlation matrix learning device uses the new threshold $TH_{j+1}$ to execute Steps S201 through S204 for all of the codewords X again. Steps S201 through S206 are repeatedly executed while updating the threshold (via Steps S207 and S208) until $|y_m| \geq TH_j$ no longer applies to any of the codewords in Step S206.

When $|y_m| \geq TH_j$ no longer applies to any of the codewords X in Step S206, the learning state monitor 18 judges whether or not the present calculation result $[y_m]$ t+1 is the same as the previous calculation result $[y_m]$ t for all of the codewords respectively (Step S209). When the calculation result $[y_m]$ t+1 output from the arithmetic unit 15 does not match the previous calculation result $[y_m]$ t, the operation returns to Step S201 to execute the above-described operation for all of the codewords X.

When $[y_m]$ t+1 equals $[y_m]$ t in Step S209, the learning operation using the update value $\Delta W_k$ is considered to be saturated (Step S210) and the learning state monitor 18 updates the update value from $\Delta W_k$ to $\Delta W_{k+1}$ (Step S211). Then, the learning state monitor 18 judges whether or not the new update value $\Delta W_{k+1}$ equals 0 (or equals substantially 0) (Step S212). If the new update value $\Delta W_{k+1}$ is not 0, then the operation returns to Step S201 to execute the above-described operation for all of the codewords X again.

When the new update value $\Delta W_{k+1}$ is judged to be 0 in Step S212, the learning operation is completed (Step S213), and the threshold $TH_j$ at this point is the optimal value for all of the codewords and the resulting correlation matrix is the optimal correlation matrix for each codeword (Step S214).

Figure 3:
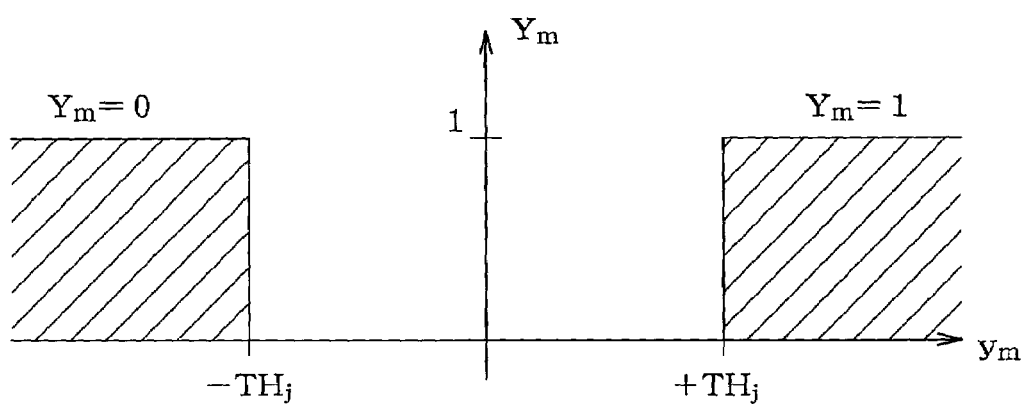
FIG. 3 is a diagram for illustrating a range of calculation result y used upon judging whether or not the learning operation for the correlation matrix has converged in the correlation matrix learning device shown in FIG. 1.

In the correlation matrix learning device according to the present embodiment, when the calculation results y output from the arithmetic unit 15 after the learning operation fall within the shaded region shown in FIG. 3 with respect to the threshold $TH_j$, the learning operation with the threshold $TH_j$ is judged to be converged, whereby the threshold is changed (increased) to $TH_{j+1}$ to repeat the learning operation.

On the other hand, when the calculation results y output from the arithmetic unit 15 after the learning operation do not fall within the shaded region shown in FIG. 3 while the values of the calculation results y equal the values resulting from the previous calculation, the learning state using the present update value $\Delta W_k$ is judged to have reached the saturation state and thus the update value is changed (decreased) from $\Delta W_k$ to $\Delta W_{k+1}$ to repeat the learning operation.

Accordingly, the correlation matrix learning device according to the present embodiment provides an optimal threshold $TH_j$ for all of the multiple codewords X as well as an optimal correlation matrix W used for obtaining the original codeword Y from all of the codewords X.

According to the above-described embodiment, a special purpose computer specified in the learning operation has been illustrated. However, the above-described operation of the present invention can be realized as a program to be executed on a general computer.

In a method for learning a correlation matrix according to the present invention, the results of the calculation of a codeword and the pre-learned correlation matrix are compared to thresholds, based on which the pre-learned correlation matrix is updated to obtain a post-learned correlation matrix, wherein learning operation for the correlation matrix is repeated while the threshold (absolute value) is stepwisely increased as the learning operation proceeds. As a result, a threshold as well as a correlation matrix that are optimal for all of the multiple codewords can readily and rapidly be obtained.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and rage of equivalency of the claims are therefore intended to be embraced therein.

The entire disclosure of Japanese Patent Application No. 2001-119614 (Filed on Apr. 18, 2001) including specification, claims, drawings and summary are incorporated herein by reference in its entirety.

What is to be claimed:

1. A decoding method to be performed on a computer, utilizing a correlation matrix that obtains an original codeword from a different codeword, said method comprising:
    inputting the original codeword;
    inputting the different codeword;
    activating the computer to perform a predetermined calculation with the different codeword and a pre-learned correlation matrix;
    activating the computer to compare the calculation results with a threshold;
    activating the computer to update the pre-learned correlation matrix based on the comparison results to obtain a post-learned correlation matrix;
    activating the computer to judge whether the comparison results satisfy a first predetermined condition;
    if the comparison results satisfy the first predetermined condition, activating the computer to increase the absolute value of the threshold;
    activating the computer to repeat the calculation, the comparison, and the updating, using the obtained post-learned correlation matrix as a new pre-learned correlation matrix, until the result remains substantially the same, thereby obtaining an optimal correlation matrix;
    activating the computer to decode a block code, utilizing the optimal correlation matrix;
    providing the decoded block code to a user; and
    utilizing the decoded block code,
    wherein the different codeword is represented by N-dimensional column vectors, and the original codeword is represented by M-dimensional column vectors so that the pre-learned correlation matrix has N rows and M columns, and
    wherein in the calculation, the different codeword is multiplied by the pre-learned correlation matrix to obtain the M-dimensional column vectors.

2. A decoding method according to claim 1, wherein:
    the correlation matrix is updated by using an update value,
    if the comparison results do not satisfy the first predetermined condition, the method further comprises activating the computer to decrease the absolute value of the update value at a predetermined rate if calculation results satisfy a second predetermined condition, while not changing the update value if the calculation results do not satisfy the second predetermined condition.

3. A decoding method according to claim 2, wherein when the update value reaches 0, the pre-learned correlation matrix is judged as the optimal correlation matrix, thereby completing the operation.

4. A decoding method according to claim 1, wherein:
    the threshold has M number of elements corresponding to respective elements of the M-dimensional column vectors indicating the original codeword; and
    in the comparison, the elements of the M-dimensional column vectors indicating the calculation results are compared with the respective M number of thresholds; and
    in the updating, the pre-learned correlation matrix is updated at a column unit basis based on the corresponding comparison result.

5. A decoding method according to claim 1, wherein:
    a plurality of different codewords and a plurality of original codewords corresponding to the plurality of different codewords are prepared; and
    each set of an original codeword and a corresponding different codeword is subjected to the calculation, the comparison, and the updating, and it is judged whether the comparison results satisfy the first predetermined condition.

6. A decoding system utilizing a correlation matrix that obtains an original codeword from a different codeword, said system comprising;
    an arithmetic unit for performing a predetermined calculation using the different codeword and a pre-learned correlation matrix;
    a comparison unit for comparing the calculation results output from the arithmetic unit with a threshold; and
    a learning state monitor for updating the pre-learned correlation matrix based on the comparison results output from the comparison unit to obtain a post-learned correlation matrix, wherein: the obtained post-learned correlation matrix is used as a new pre-learned correlation matrix to repeat the predetermined calculation, the comparison and the updating to obtain an optimal correlation matrix,
    every time the learning state monitor receives the comparison results, the learning state monitor judges whether or not the comparison results satisfy a first predetermined condition, and
    the system further comprises:
        a threshold controller for increasing the absolute value of the threshold at a predetermined rate when the first predetermined condition is satisfied, and
        a decoding device for decoding a block code, using the optimal correlation matrix,
    wherein the different codeword is represented by N-dimensional column vectors, and the original codeword is represented by M-dimensional column vectors so that the pre-learned correlation matrix has N rows and M columns, and
    wherein in the calculation, the different codeword is multiplied by the pre-learned correlation matrix to obtain the M-dimensional column vectors.

7. A decoding system according to claim 6, further comprising a learning state monitor for updating the pre-learned correlation matrix by using an update value,
    wherein when the comparison results do not satisfy the first predetermined condition, the threshold controller decreases the absolute value of the update value at a predetermined rate if the calculation results satisfy a second predetermined condition, and does not change the update value if the calculation results do not satisfy the second predetermined condition.

8. A decoding system according to claim 7, wherein when the update value reaches 0, the learning state monitor judges the pre-learned correlation matrix as an optimal correlation matrix, thereby completing the operation.

9. A decoding system according to claim 6, wherein:
the threshold has M number of elements corresponding to respective elements of the M-dimensional column vectors indicating the original codeword;
the comparison unit compares the elements of the M-dimensional column vectors indicating the calculation results with the M number of respective thresholds; and
the learning state monitor updates the pre-learned correlation matrix at a column unit basis based on the corresponding comparison results.

10. A decoding system according to claim 6, wherein:
as the different codeword and the original codeword, a plurality of different codewords and a plurality of original codewords corresponding to the plurality of different codewords are prepared; and
each set of the original codeword and the corresponding different codeword is used to execute the predetermined calculation by the arithmetic unit, the comparison by the comparison unit and the updating of the pre-learned correlation matrix by the learning state monitor, and then the learning state monitor judges whether or not the comparison results satisfy the first predetermined condition.

11. A computer readable storage medium having stored thereon a program for performing a correlation matrix learning for obtaining an optimal correlation matrix used for obtaining an original codeword from a different codeword, the program commanding a computer to:
perform a predetermined calculation with the different codeword and a pre-learned correlation matrix;
compare the calculation results with a threshold;
update the pre-learned correlation matrix based on the comparison results to obtain a post-learned correlation matrix;
judge whether the comparison results satisfy a first predetermined condition;
increase the absolute value of the threshold at a predetermined rate if the comparison results satisfy the first predetermined condition; and
repeat the calculation, the comparison, and the updating, using the obtained post-learned correlation matrix as a new pre-learned correlation matrix, thereby obtaining an optimal correlation matrix,
wherein the different codeword is represented by N-dimensional column vectors, and the original codeword is represented by M-dimensional column vectors so that the pre-learned correlation matrix has N rows and M columns, and
wherein in the calculation, the different codeword is multiplied by the pre-learned correlation matrix to obtain the M-dimensional column vectors.

12. A computer readable storage medium according to claim 11, wherein:
the program further commands the computer to update the correlation matrix by using an update value,
if the comparison results do not satisfy the first predetermined condition, the program further commands the computer to decrease the absolute value of the update value at a predetermined rate if the calculation results satisfy a second predetermined condition, while not changing the update value if the calculation results do not satisfy the second predetermined condition.

13. A computer readable storage medium according to claim 12, wherein when the update value reaches 0, the program further commands the computer to judge the pre-learned correlation matrix as the optimal correlation matrix, thereby completing the operation.

14. A computer readable storage medium according to claim 11, wherein:
the threshold has M number of elements corresponding to respective elements of the M-dimensional column vectors indicating the original codeword; and
in the comparison, the elements of the M-dimensional column vectors indicating the calculation results are compared with the M number of respective thresholds; and
in the updating, the pre-learned correlation matrix is updated at a column unit basis based on the corresponding comparison results.

15. A computer readable storage medium according to claim 11, wherein:
a plurality of different codewords and a plurality of original codewords corresponding to the plurality of different codewords are prepared; and
each set of an original codeword and a corresponding different codeword is subjected to the calculation, the comparison, and the updating and it is judged whether the comparison results satisfy the first predetermined condition.

16. A decoding method to be carried out on a computer, utilizing a correlation matrix that obtains an original codeword from a different codeword, the method comprising:
inputting a first codeword into the computer;
activating the computer to perform a predetermined calculation with the first codeword and a pre-learned correlation matrix;
activating the computer to compare the calculation results with a threshold;
activating the computer to update the pre-learned correlation matrix based on the comparison results to obtain a post-learned correlation matrix;
activating the computer to judge whether the comparison results satisfy a first predetermined condition;
if the comparison results satisfy the first predetermined condition, activating the computer to increase the absolute value of the threshold at a predetermined rate;
activating the computer to repeat the calculation, the comparison, and the updating, using the obtained post-learned correlation matrix as a new pre-learned correlation matrix, until the result remains substantially the same, thereby obtaining an optimal correlation matrix;
activating the computer to decode a block code, utilizing the optimal correlation matrix; and
utilizing the decoded block code,
wherein the different codeword is represented by N-dimensional column vectors, and the original codeword is represented by M-dimensional column vectors so that the pre-learned correlation matrix has N rows and M columns, and
wherein in the calculation, the different codeword is multiplied by the pre-learned correlation matrix to obtain the M-dimensional column vectors.

17. A decoding method according to claim 16, wherein:
the correlation matrix is updated by using an update value,
if the comparison results do not satisfy the first predetermined condition, the method further comprises activating the computer to decrease the absolute value of the update value at a predetermined rate if calculation results satisfy a second predetermined condition, while not changing the update value if the calculation results do not satisfy the second predetermined condition.

18. A decoding method according to claim 17, wherein when the update value reaches 0, the pre-learned correlation matrix is judged as the optimal correlation matrix, thereby completing the operation.

19. A decoding method according to claim 16, wherein:

the threshold has M number of elements corresponding to respective elements of the M-dimensional column vectors indicating the original codeword;

in the comparison, the elements of the M-dimensional column vectors indicating the calculation results are compared with the respective M number of thresholds; and in the updating, the pre-learned correlation matrix is updated at a column unit basis based on the corresponding comparison result.

20. A decoding method according to claim 16, wherein:

a plurality of first codewords and a plurality of original codewords corresponding to the plurality of first codewords are prepared; and each set of an original codeword and a corresponding first codeword is subjected to the calculation, the comparison, and the updating, and it is judged whether the comparison results satisfy the first predetermined condition.

* * * * *